United States Patent

Moore et al.

[15] 3,639,148
[45] Feb. 1, 1972

[54] POLYMER FILM SUBSTRATE WITH VINYLIDENE CHLORIDE BASE COATING AND WAX ANTISTICKING TOP COATING

[72] Inventors: Carl Moore; Dale S. Gibbs; John W. Vanderhoff, both of Midland, Mich.

[73] Assignee: The Dow Chemical Company, Midland, Mich.

[22] Filed: Apr. 2, 1970

[21] Appl. No.: 25,261

[52] U.S. Cl. ............117/76 F, 117/29, 117/47 A, 117/76 P, 117/92, 117/122 H., 117/138.8 E, 117/138.8 UA, 117/138.8 F, 117/145
[51] Int. Cl. .................B32b 27/08, B32b 27/30
[58] Field of Search...........117/76 F, 92, 122 H, 138.8 E, 117/138.8 A, 72, 161 UC

[56] References Cited

UNITED STATES PATENTS

| 3,400,008 | 9/1968 | Bleyle et al. | 117/92 X |
| 2,748,027 | 5/1956 | Meier | 117/138.8 A X |
| 3,108,017 | 10/1963 | Messwarb et al. | 117/138.8 A |
| 3,362,841 | 1/1968 | Menikheim et al. | 117/138.8 E X |
| 2,525,671 | 10/1950 | Hauser | 117/161 UC |
| 3,262,808 | 7/1966 | Crooks et al. | 117/138.8 E X |
| 2,805,963 | 9/1957 | Gaylord | 117/161 UC X |
| 3,428,483 | 2/1969 | Owens | 117/138.8 A X |

*Primary Examiner*—William D. Martin
*Assistant Examiner*—Ralph Husack
*Attorney*—Griswold & Burdick, Ronald G. Brookens and Albin R. Lindstrom

[57] ABSTRACT

A composite article and method for preparing the same wherein such article is composed of a macromolecular organic substrate having at least one surface wherein the contact angle of water to such surface is less than about 80°, a base coating for such surface of a copolymer consisting principally of a normally crystalline vinylidene chloride polymer coating and a top coating containing an antisticking agent.

4 Claims, No Drawings

3,639,148

POLYMER FILM SUBSTRATE WITH VINYLIDENE CHLORIDE BASE COATING AND WAX ANTISTICKING TOP COATING

BACKGROUND OF THE INVENTION

The normally crystalline vinylidene chloride polymers are widely used as barrier and heat seal coatings for paper, films and sheets. For optimum properties, such coatings are generally deposited as a film forming latex wherein the vinylidene chloride polymer is in an initially essentially amorphous, i.e., noncrystalline state. Such latex materials have heretofore necessarily contained significant amounts of soaps required for colloidal stability of the polymeric ingredients as well as formulating agents comprising the natural or synthetic materials such as the ester waxes and pigments which are used to prevent undesirable agglutination of wound up films and the like coated articles. Such latex materials also contain conventionally used sulfate, sulfonate or phosphate surfactants to provide required wettability and flow and to maintain the stability of the latex additives.

It has been found, however, that the presence of such conventionally employed formulating agents in the polymeric latex coating deleteriously affects the adhesion of such coatings to the surface being coated, particularly under conditions of high humidity, to the extent of making it necessary to utilize an intermediate layer of a fastening agent, such as a urea formaldehyde resin or a reaction product of such resin with glycerol or glycol, polyalkylene amines or other suitable substances.

Further, the presence of such conventionally used formulating agents often significantly adversely affects the barrier properties of the coatings and in some instances the coatings become milky or cloudy when exposed to conditions of high humidity. Such formulating agents also often adversely affect the heat-sealability characteristics of the coatings by exuding to the coating surface.

Still further, the heretofore employed formulated latexes of the normally crystalline vinylidene chloride latex materials have generally not been capable of utilization in high-speed coating applications due to the time required for the initially essentially amorphous vinylidene chloride polymer constituent to become sufficiently crystalline and thereby provide necessary resistance to blocking and optimum barrier properties.

It is an object of the present invention to provide articles coated with a normally crystalline vinylidene chloride polymer wherein adhesion of the coating to the substrate being coated is retained even under conditions of high humidity and in the presence or absence of intermediate layers of fastening agents; wherein the vinylidene chloride polymer coating provides excellent barrier properties and does not become milky or cloudy when exposed to conditions of high humidity, wherein such coated articles have excellent heat seal and slip properties; and wherein the coated articles may be prepared using high-speed coating techniques currently used in film manufacture.

It is a further object to provide coated articles, and a method of preparing the same, wherein a normally highly crystalline, essentially nonformulated, vinylidene chloride polymer coating is protected by a top coating whereby the initially essentially amorphous vinylidene chloride polymer constituent of such coating may become sufficiently protected to permit it to become crystalline and thereby provide optimum barrier properties even when such coatings are applied during high-speed coating and winding operations.

SUMMARY OF THE INVENTION

The objects of this invention are obtained in and by the preparation of improved coated articles comprising
1. a macromolecular organic substrate having at least one surface wherein the contact angle of water to such surface is less than about 80°,
2. a base coating for such surface composed of an essentially nonformulated copolymer containing in chemically combined form from about 70 to 95 percent by weight of vinylidene chloride and from about 5 to 30 percent by weight of at least one monoethylenically unsaturated comonomer, and
3. a top coating containing an antisticking agent.

DESCRIPTION OF THE PREFERRED EMBODIMENTS

The macromolecular substrates which are coated according to the invention include synthetic resinous film and foils such as those prepared from the resinous polyolefins such as polyethylene, polypropylene, and resinous copolymers thereof; thermoplastic polymers and copolymers of methylmethacrylate, such as its homopolymer and copolymers thereof with vinylidene chloride, thermoplastic polymers and copolymers of vinyl chloride including homopolymeric vinyl chloride; and thermoplastic ester and ether derivates of cellulose including cellulose acetate, cellulose propionate, cellulose acetate butyrate, ethyl cellulose, and the like. Other thermoplastic resinous substrates which may be used include chlorinated polyolefins such as chlorinated polyethylene, chlorinated polypropylene and the like, as well as saran resins, which include thermoplastic copolymers of vinylidene chloride with one or more monomers such as vinyl chloride, acrylates and esters such as ethyl acrylate and the like. Other substrates include the synthetic linear polyesters, as for example those materials prepared by reacting terephthalic acid, dialkyl terephthalates, or ester-forming derivates thereof with a glycol of the series

$$HO(CH_2)_nOH$$

where $n$ is a whole number within the range of 2-10.

It is a requirement of this invention that the substrate surface(s) to be coated provides a contact angle of water to such surface of less than about 80°, whereby required adhesion between the substrate and the subsequently applied base coat, in the absence of intermediate layers of fasteners, is achieved. Such characteristic may be inherent in the substrate surface or may be imparted thereto as, for example, by subjecting such surface, prior to coating thereof, to oxidative influences of the oxygen type, e.g., by the utilization of corona discharge or by flame treatment, or by chemical oxidative treatment such as by the application of dichromic acid, $NO_2$, and the like.

For optimum adhesion and other properties it is desirable to utilize macromolecular organic substrate surfaces wherein the contact angle of water to such surface is at least about 40° but less than about 80°, and preferably between about 45° and 70°.

The base coatings utilized by this invention are composed of essentially nonformulated normally crystalline vinylidene chloride polymers, i.e., copolymers essentially devoid of conventional sulfate, sulfonate or phosphate surfactants as well as conventionally used slip and antiblocking agents.

The term "normally crystalline vinylidene chloride polymers" as used herein means polymers containing from 70 to 95 percent vinylidene chloride and 30 to 5 percent of at least one monomer copolymerizable with vinylidene chloride, exemplary of which are vinyl chloride, vinyl acetate, vinyl propionate, acrylonitrile, alkyl and aralkyl acrylates and alkacrylates having alkyl and aralkyl groups of up to about eight carbon atoms, acrylic acid, acrylamide, vinyl alkyl ethers, vinyl alkyl ketones, acrolein, allyl esters and ethers and butadiene, among others.

Exemplary of preferred polymers are the copolymers containing between about 80 to 95 percent by weight of vinylidene chloride.

The base coatings of the present invention are applied as latexes of the normally crystalline vinylidene chloride polymers wherein such latexes are free from antiblocking and slip agents as well as being essentially free from the conventionally used sulfate, sulfonate or phosphate surfactants. Such latexes may contain, however, small amounts, e.g., from about 0.5 to 2.5 parts and preferably from about 0.8 to 1.6 parts of polymer, of: nonionic surface active agents such as nonyl phenyl polyethoxyethanol, octyl phenyl polyethoxyethanol and the like, anionic material such as the sodium and ammonium oleates, or salts of fatty acids as well as salts of resin acids, without detriment to adhesion, barrier or heat-sealability properties of the base coating. Further, the vinylidene chloride polymer constituent of such latex may be interpolymerized with comonomeric materials having surface active characteristics without adverse affect upon coating adhesion, barrier or heat sealability. The amount of surfactant used is preferably less than that required for complete surface coverage of the latex particles, with a latex surface tension of from about 40–55 dynes/cm. being permissible.

Typically, the latexes contemplated for use have particle sizes ranging from about 300 angstroms to about 3,000 angstroms, with particle sizes of from about 1,500 to 2,000 angstroms being preferred. The latex materials generally contain solid material in amounts of from 10 to 50 percent based on the weight of the latex.

The top coating used may be a thin, essentially uniform continuous coating composed essentially of an antisticking material wherein such material, generally in the form of an aqueous emulsion, is sprayed, wiped or placed on the base coating by the use of offset printing rolls or electrostatic spraying and the like. Such coatings may also be applied as liquid dispersions or solutions or as finely divided powders.

Where a thin coating of emulsified antisticking agent is used as the top coat, satisfactory slip and antiblocking characteristics are obtained without significant loss of heat seal strength or adhesion. By way of contrast, where the antisticking agents are incorporated into the base coating, significantly greater amounts are required to provide equivalent slip and antiblocking properties, and undesirable loss of adhesion in the base coatings is observed.

Alternatively, the top coat may be comprised of a separate coating of a film forming polymeric latex formulated with the necessary antisticking agents.

In this regard, any of a wide variety of thermoplastic polymers can be used including a variety of vinylidene chloride polymer latexes. The choice of the latex used depends upon which properties are desired on the film surface, e.g., low heat-seal temperatures as provided by materials having a lower degree of crystallinity, or lower softening temperature can be obtained by proper selection of the latex. Such latexes, in addition to the hereinafter described antisticking agents, may contain any surfactant which does not interfere significantly with heat sealing, however, the hereinbefore mentioned nonionics, anionics and fatty acid or resin acid materials are preferred.

The antisticking agents contemplated for use by this invention include the waxes such as microcrystalline aliphatic solids, emulsifiable hydrocarbons, natural materials such as carnauba and bayberry and the like, as well as pigments, such as mica, talc and calcium carbonate and the like; with emulsifiable mixtures of a wax, such as carnauba wax, and talc being preferred.

The following example serves to illustrate the invention, but is not intended to limit the invention thereto:

EXAMPLE

In each of a series of experiments, a major surface of a 125-gauge film material, as hereinafter identified, was subjected to corona discharge to provide a contact angle of water on such surface in the 56–60° range.

The treated surfaces of each of these substrate materials where then individually coated with at least one of a series of latex coating materials using wire wound rods. The coatings were dried and fused by placing the coated substrates in a forced draft oven for a period of about 2 minutes wherein the temperature of the oven was maintained at 125°C.

The latex coatings used were of the following composition.

Coating "A" (unformulated)

A copolymeric latex consisting of 85 parts by weight vinylidene chloride, 13 parts by weight acrylonitrile, and 2 parts by weight 2-ethylhexyl acrylate wherein the initial latex was characterized by having a solids content of about 50 percent, a pH of about 1.9 and a surface tension of about 64 dynes/cm. The nonionic surfactant nonyl phenoxypoly(ethylenoxy)ethanol was added to the latex in an amount of 1 percent by weight of latex solids with a resulting latex surface tension of about 50 dynes/cm.

Coating A (formulated)

As per "A" above but containing about 3 parts by weight of latex solids of emulsified carnauba wax and 0.6 part by weight talc.

Coating B (unformulated)

A copolymeric latex consisting of 81 parts by weight of vinylidene chloride, 15 parts by weight of butyl acrylate and 4 parts by weight of methyl methacrylate and having 1.5 percent by weight of copolymer of comonomeric 2-sulfoethyl methacrylate interpolymerized therewith. The initial latex was characterized by having a solids content of about 53.2 and the particle size of the polymer solids was about 1,250 angstroms and a surface tension of 60.5 dynes/cm.

Coating B (formulated)

As per "B" above but containing about 3 parts by weight of latex solids of emulsified carnauba wax and 0.6 part by weight of talc.

Coating C (unformulated)

A copolymer latex consisting of 80 parts by weight of vinylidene chloride, 10 parts by weight of n-butyl acrylate and 10 parts by weight of methyl methacrylate and having 1.2 percent by weight of copolymer of 2-sulfoethyl methacrylate interpolymerized therewith. The initial latex was characterized by having a solids content of about 51.6 percent and the particle size of the polymer solids was about 1,175 angstroms.

Coating C (formulated)

As per "C" above but containing about 3 parts by weight of latex solids of emulsified carnauba wax and 0.6 part by weight talc.

Coating D

An aqueous dispersion containing about 1 percent by weight of carnauba wax, 0.25 percent talc, 0.13 percent sodium oleate and 0.2 percent of the nonionic surfactant "Dowfax 9N9." The dispersion was characterized by having a surface tension of from about 38–41 dynes/cm. and was applied to the base coat using a number 4 wire wound rod followed by a 60-second heating at 125°C.

In some instances, a formulated top coating, selected from coatings "A," "B," "C" and "D" above, were applied essentially as herein described.

The hot-tack adhesion of each base coating to the substrate in gms./inch at 275° F. for 1 sec. under 20 p.s.i. was determined utilizing calibrated springs in a commercial "Robot" heat sealer (Model RT-F).

Results of such testing and identification of the coated substrates used is set forth in the following Table I.

TABLE I

| Sample Identification | | | Hot-tack adhesion of base coat on identified substrate [1] | | |
|---|---|---|---|---|---|
| Sample No. | Base coat | Top coat | Polypropylene | Glassine | Mylar |
| 1 | Coating A (formulated) | None | 20 | 59 | 71 |
| 2 | Coating A (unformulated) | Coating A (formulated) | 41 | 80 | 80 |

TABLE I—Continued

| Sample Identification | | Hot-tack adhesion of base coat on identified substrate [1] | | |
|---|---|---|---|---|
| Sample No. | Base coat | Top coat | Polypropylene | Glassine | Mylar |
| 3 | Coating B (formulated) | None | 20 | 59 | 59 |
| 4 | Coating B (unformulated) | Coating B (formulated) | 80 | 80 | 80 |
| 5 | Coating A (unformulated) | ...do... | 59 | | |
| 6 | Coating C (formulated) | None | [2] 59 | | |
| 7 | Coating C (unformulated) | Coating C (formulated) | [2] 71 | | |
| 8 | Coating A (unformulated) | Coating D (formulated) | 71 | | |

[1] Test conditions, 275° F., 1 sec. dwell time and 20 p.s.i.
[2] Determined at 260° F.

The data presented in Table I specifically illustrates the unexpectedly improved adhesion obtained between base coat and substrate wherein a base coat is used (which is devoid of antiblocking and slip agents) in combination with a top coat containing such agents. In all examples above, the coated substrates were found to be essentially nonblocking after aging of each of the coated substrates in a 55° C. oven for extended periods, and were further characterized by having very desirable slip properties, i.e., having a static coefficient of friction of about 0.27 and a dynamic coefficient of friction of about 0.20.

The following Table II sets forth heat-seal strengths of various combinations of the coated structures identified in Table I wherein all samples are coated 125-gauge, corona discharge treated polypropylene film. In each instance, heat seals were made with a Robot Model RT-F Heat Sealer at 275° F. using 20 p.s.i. for 1 second and the seal strength measured following exposure to varying conditions of relative humidity, using an Instron Tester at 70° F. with a 2-inch per minute crosshead speed and the initial yield recorded when the seals peeled.

TABLE II

| Sample No. | Base coat | Top coat | Heat-seal strength (gram/inch) | |
|---|---|---|---|---|
| | | | 50% R, humidity | 100% humidity |
| 9 | Coating A (formulated) | None | 243 | 114 |
| 10 | Coating A (unformulated) | Coating A (formulated) | 520 | 548 |
| 11 | Coating B (formulated) | None | 165 | |
| 12 | Coating B (unformulated) | Coating B (formulated) | 379 | |
| 13 | Coating A (unformulated) | Coating D | 482 | 380 |

The above data illustrates the unexpected enhancement of heat-seal strength obtained wherein an unformulated base coat is used in combination with a formulated top coat as contemplated by this invention.

What is claimed is:

1. A composite article comprising
   1. a polymer film substrate having at least one surface wherein the contact angle of water to said surface is less than about 80°,
   2. a base coating for said surface wherein said base coating is substantially free from antiblocking agents and slip agents and wherein said coating consists essentially of a normally crystalline copolymer containing in chemically combined form from about 70 to 95 percent by weight of vinylidene chloride and from about 5 to 30 percent by weight of at least one monoethylenically unsaturated comonomer, and
   3. a top coating consisting of an antisticking composition consisting essentially of the dried residue of a wax emulsion.

2. The article of claim 1 wherein said substrate is a polyolefin film.

3. The article of claim 2 wherein said polyolefin film is a polypropylene film.

4. The article of claim 1 wherein said wax emulsion consists essentially of a mixture of about 4 parts by weight of carnauba wax and 1 part by weight of talc.

* * * * *